United States Patent Office 3,533,723
Patented Oct. 13, 1970

3,533,723
METALLIZED POLYPROPYLENE DYEING WITH O - HYDROXY-, O′ ALKYLAMINONAPHTHA-LENEAZO NAPHTHALENE
Shinya Itoh, Kyoto, Yoshitaka Kubota, Ohtsu-shi, and Masao Iizuka, Yokohama, Japan, assignors to Toyo Rayon Kabushiki Kaisha, Tokyo, Japan, a corporation of Japan
No Drawing. Filed Dec. 28, 1964, Ser. No. 421,639
Claims priority, application Japan, Mar. 20, 1964, 39/8,773
Int. Cl. D06p 1/10
U.S. Cl. 8—42         3 Claims

---

ABSTRACT OF THE DISCLOSURE

Process for coloring a shaped polyolefin article containing a metal compound, which process comprises coloring a shaped polyolefin article containing such metal compound with a dyestuff selected from 2-hydroxy-2′-lower-alkylamino benzene azo naphthalene wherein the benzene ring may be further substituted with a group selected from halogen, alkyl, alkoxy, nitro or acyl and 2-hydroxy-2′-lower alkylamino naphthaleneazo naphthalene.

---

This invention relates to a process for coloring a polyolefinic shaped article containing a metal compound by means of a specified dyestuff which can give the brightness of shade and fastness characteristics.

Generally speaking, the polymers of olefines such as ethylene and propylene substantially lack in dyestuff binding groups. Therefore, they exhibit a very small degree of affinity for dyestuffs or pigments which are usually used for coloring natural or synthetic substances. Though having temporary affinity for a polyolefinic shaped article, these dyestuffs tend to bleed out. It has been difficult in practice to obtain the dyeings of a polyolefine shaped article which exhibit excellent fastness to light, washing, dry cleaning, sublimation and rubbing.

It has hitherto been proposed with a purpose of overcoming these difficulties to incorporate as a dyestuff binding agent a certain class of metal compound in a polyolefinic resin and to dye the shaped article which is obtained by melt spinning this blend. For instance, the specification of U.S. Pat. No. 2,984,634 proposes a process which comprises incorporating a metal compound, being a 6 to 12 carbon atom carboxylic acid salt of nickel, chromium, cobalt, aluminium, titanium and zirconium into a crystalline polymerized α-monoolefinic hydrocarbon in an amount of 0.1 to 2% by weight calculated as metal, shaping the blend and thereafter coloring the shaped article by means of an anthraquinonic dyestuff. However, the use of this anthraquinonic dyestuff does not give rise to fully satisfactory colorings. Also, Japanese Patent Publication No. 4477/1963 describes a process which comprises coloring an article of poly-α-olefine wherein there is incorporated a basic or anionic exchange substance containing the metal of Group 2a, 2b or 4a of the Periodic Table by using a dyestuff having a slightly ionizable acidic group and thereby forming a salt or chelate of the dyestuff and the metal. However, the process shown in this publication does not impart satisfactory fastness to light, washing, dry-cleaning and rubbing. Some of the named dyestuffs never bring about commercially allowable dyeings. Elsewhere, Belgian Pats. Nos. 632,652 and 632,653 propose a method of coloring the Werner-complex-forming metal containing polymer of ethylene or propylene by means of a monoazo dyestuff containing a group capable of forming a metal chelate with its metal. Some of the dyestuffs disclosed specifically in these Belgian patents develop a deep color in a polyolefinic shaped article containing a metal compound. However, such problems as the brightness of shade and level dyeing are still unsolved.

Accordingly, one of the objects of this invention is to present a process for dyeing a polyolefinic shaped article containing a metal compound in a brilliant shade, not in an indistinct shade peculiar with a metal-complex dyestuff. Another object of this invention is to provide a process for dyeing a polyolefinic shaped article containing a metal compound so that the dyeings may have an excellent fastness to light, dry cleaning, washing, rubbing and sublimation. Still another object of this invention is to provide a dyeing method by which a metal compound-containing polyolefinic shaped article can be dyed in deep or half color as the case may be. The other objects and advantages of this invention will become apparent from the following descriptions.

The process for coloring a polyolefinic shaped article containing a metal compound in accordance with this invention is characterised by coloring an article of polyolefine obtained by melt-shaping a polyolefinic resin wherein there is incorporated at least 0.01% by weight calculated as the metal of a dissociable compound of a transition metal by means of a dyestuff of the general formula:

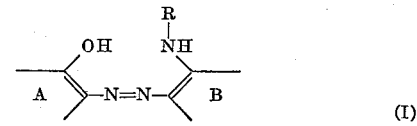

(wherein R is selected from the class consisting of hydrogen and an alkyl group having 1 to 4 carbon atoms; A is an aromatic ring having a hydroxyl group in the ortho-position to the azo group and selected from the class consisting of a benzene ring and a naphthalene ring; B is an aromatic ring having —NHR group in the ortho-position to the azo group and selected from the class consisting of a benzene ring and a naphthalene ring; and A and B may contain a substituent selected from the class consisting of halogen, alkyl, alkoxy, nitro and acyl group.

As the polyolefinic resins to be used in this invention, there are homopolymers of α-olefines such as ethylene, propylene, 3-methyl-butene-1, 4-methyl-pentene-1 and 5-methyl-hexene-1, copolymers of two or more of these α-olefines, and graft-copolymers of these parent polymers grafted with other monomers. In these olefine polymers, other polymers such as polyurea, polyurethane, epoxy resin or polycarbonate may be incorporated. Furthermore, the polyolefinic resins may contain a phenol or amine type anti-oxidation agent, an ultra-violet ray absorbent such as benzophenone derivatives or triazine derivatives or fluoroscent brightener, a delustring agent such as titanium oxide, a stabilizer such as alkali earth metal salt of fatty acid or organic phosphate or a dyeing auxiliary, or a plasticizer such as dioctylphthalate.

The metal compound to be incorporated in the polyolefinic resin in accordance with this invention is a dissociable compound of a transition metal. Nickel, zinc, copper, chromium and cobalt, especially nickel and zinc, are preferable metal components. As dissociable compounds of these metals, organic acid salts and organic complex compounds are preferable. In particular, higher carboxyl acid salts such as nickel stearate, nickel palmitate, nickel oleate, nickel naphthenate, zinc stearate, zinc oleate, zinc naphthenate, chromium stearate, cobalt stearate and copper naphthenate. Together with these higher carboxylic acids or in place of these, there can be used amino acid salts such as γ-amino acid nickel, salts of alkyl phosphate such as di-n-propyl-nickel-phosphate, n-hexylethyl-nickel-phosphate, sulphonates such as dodecyl benzene-nickel-sulphonate and t-octylbenzene-chromium-sulphonate as well as benzoates, salicylates, salts of alkylphosphite, naphthionates, and salts of alkylsulphate. Furthermore, there are organic complex salts such as nickel acetylacetonate and zinc 8-hydroxy quinolinate, and weak chelate compounds such as metal chelate compounds of malonic acid ester derivatives and metal chelate compounds of acetoacetic acid derivatives. In a metal chelate compound, the substitution of chelate takes place between this compound and the dyestuff at the time of coloring so it gives a relatively slow dyeing speed.

The transition metal compounds are incorporated in the polyolefinic resin in an amount of at least 0.01% by weight, and preferably 0.1–1% by weight calculated as metal based on the resin prior to melt-shaping.

Among the metal compounds to be incorporated in the polyolefinic resin in this invention, the metal compound of copper, silver or gold show a good coordination bond with the dyestuffs of this invention, but a defect is that when the melt temperature is high in the polyolefinic resin, they are easily changed into brown color. When the metal compound of zinc, cadmium, mercury, titanium, zirconium or hafnium is used, discoloration hardly takes place during the melt-shaping of the polyolefinic resin though the decomposition of the metal compound is more or less observable. However, it shows a little bit lower tendency to a coordination bond with the dyestuff of this invention. The metal compounds of chromium, molybdenum, or tungsten are not discolored by heat and are stable in the molten polymer. It shows a slight inferiority in the dyeing effect to be brought about by a coordination bond with the dyestuff of this invention, but exhibits excellent fastness properties. The metal compounds of iron, cobalt or nickel give good thermal stability in the molten polymer, a coordination bond with the dyestuff of this invention and fastness of color; it gives rise to the most excellent effects. The use of a cobalt compound, however, involves some deterioration in the weatherability of the polymer.

In this invention, a polyolefinic shaped article containing a metal compound is colored by means of a specified dyestuff represented by the general Formula I above. The dyestuff to be used in this invention can be synthesised by diazotizing a diazo component of the general formula:

(II)

in a known manner and coupling it with a coupling component of the general formula:

(III)

or by other methods.

Examples of the diazo component are o-aminophenol, 4-methyl-2-aminophenol, 4-chloro-2-aminophenol, 4-nitro-2-aminophenol, 5-nitro-2-aminophenol, 4-acetyl-2-aminophenol, 4,6-dichloro-2-aminophenol, 3-amino-4-oxy-5-nitro-acetanilide, 2-amino-6-nitro-p-cresol, 2-amino-5-nitro-p-cresol, and 1-amino-2-naphthol.

As examples of the coupling component, there are 2-naphthylamine, N-methyl-2-naphthylamine, N-ethyl-2-naphthylamine and N,N'-diethyl-m-phenylenediamine.

In consideration of the color shade, brightness and fastness of the dyeings obtained by the dyestuffs of this invention, zinc, copper, chromium, and particularly nickel, are preferable as a metal component.

The polyolefinic resin in which a transition metal compound is incorporated can be melt-shaped, quenched and stretched in accordance with the known manner.

In the practice of the process covered by this invention, the said water-insoluble mono-azo dyestuff of the Formula I is dispersed in the water or solubilized with the acid of a dispersant or a solubilizing agent. As a dispersant or solubilizing agent, there are used optional anionic and non-ionic surfactants. However, when this dyestuff is used on dissolution in a polyoxyethylene non-ionic surfactant wherein polyoxyethylene accounts for 60–85% instead of an ordinary anionic levelling agent or a very hydrophilic non-ionic levelling agent, this dyestuff permeates into the polyolefine shaped article homogeneously and excellently. It is especially preferable, therefore, to prepare the dyeing liquid by using this kind of dyestuff treating agent. A particularly good dyeing liquid is obtained by fusing the dyestuff with this kind of dyestuff treating agent, followed by dilution.

In this invention, optional dyeing methods such as a carrier dyeing method, a solubilization dyeing method, a high pressure high temperature dyeing method, and a thermosol dyeing method can be employed in carrying out the dyeing by using the said dyestuff (I). The amount of the dyestuff to be used in this invention can be varied over a wide range, but about 0.1–6% against the material to be dyed is suitable. The dyeing temperature should preferably be 70–120° C., when the dyeing is carried out at a temperature raised beyond this, there is a tendency that the amount of adsorption is decreased. In the dyeing process of this invention, the adjustment of the pH of the dyeing liquid to 3–8 gives rise to excellent dyeing effects, but when dyeing is carried out by using a dyeing liquid having the pH of more than 9 or stronger acidity, the color value is somewhat decreased.

The dyeings are treated with a wash liquid in which is incorporated soap or an equally effective surfactant, washed and dried; or reduction washing may be effected by using hydrosulphite, caustic soda and suitable surfactant. In accordance with this invention, remarkably brilliant dyeings of a polyolefinic shaped article containing a metal compound can be obtained free from a peculiar indistinctness caused by the ordinary metal complex dyestuff. It is also possible to obtain dyeings having excellent fastness to light, washing, dry cleaning and rubbing.

The dyestuff to be used in this invention, for instance, the dyestuff of the following formula shown in Example 1:

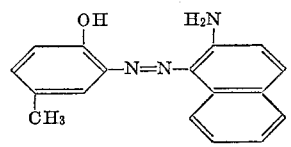

exhibits excellent resistance to alkali. On the other hand, a previously known dyestuff, for instance, the brown dyestuff of the following formula:

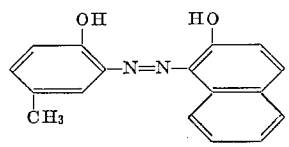

tends to show poor resistance to alkali as shown in the following table.

| | Fastness to Washing (AATCC 36-1961-III) | |
|---|---|---|
| | Discoloration | Stain |
| Dyestuff of this invention, grade | 5 | 4 |
| Control dyestuff of the conventional type, grade | 3 | 1 |

The dyestuff of this invention has a markedly improved resistance to alkali because —OH group is replaced by —NH$_2$ group.

The following examples explain this invention. Unless otherwise specified, the part means a part by weight. An intrinsic viscosity of the polymer is the value determined in tetralin of 135° C. The evaluation of the fastness of dyeings was conducted in accordance with the AATCC method.

Fastness to light (AATCC 16A—1963)
Fastness to washing (AATCC 36—1961-III)
Fastness to rubbing (AATCC 8—1961)
Fastness to dry cleaning (AATCC 85—1963)

EXAMPLE 1

(a) Preparation of polypropylene fibre containing metal

Some 97 parts of powder isotactic polypropylene having an intrinsic viscosity of 1.53 and 3 parts of powder nickel stearate were mixed by melting to make a chip which was then melt spun at 240° C. and stretched 5× by the conventional method to obtain a yarn. This yarn was offered for coloring.

The yarn has an apparent fineness of 3.10 d., dry strength of 6.39 g./d. and dry elongation of 48.2%.

(b) Method of coloring 0.2 g. of the dyestuff represented by the following structural formula:

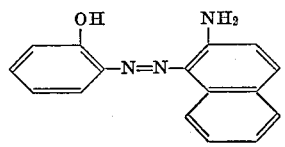

were kneaded well with 0.2 g. of sodium dinaphthylmethanedisulfonate and 0.05 g. of sodium dodecylbenzene sulfonate, and dispersed in 500 cc. of water. Then 10 g. of the yarn described in (a) above were dipped in this bath. The bath was heated to 98° C. in 20 minutes. Treatment was effected at this temperature for 1 hour. Thereafter, soaping treatment was done by means of a weak alkaline washing liquid of a non-ionic surfactant to give a brown dyeing which had excellent fastness to light, washing, rubbing, dry-cleaning, etc. Furthermore, it was found that a dyeing speed of this dyestuff is ideal in practice, and that the dyestuff of this invention gives the best level dyeing.

(c) Properties of dyeing

The fastness of this dyeing was determined in accordance with AATCC methods. The results are shown below.

|  | Grade |
|---|---|
| Fastness to dry-cleaning [1] | 4 |
| Fastness to rubbing | 4 |
| Fastness to light | 5 |
| Fastness to washing [1] | 4 |

[1] Hereinafter, fastnesses to dry-cleaning and washing are shown by a lower grade of those determined in respect of discoloration and stain.

EXAMPLES 2–13

(a) Preparation of polypropylene fibre containing metal compound

A chip containing 97 parts of isotactic polypropylene having an intrinsic viscosity of 1.60 and 3 parts of nickel palmitate was spun at 260° C. and stretched to give a yarn to be dyed.

(b) Method of dyeing

Each 0.3 g. of the dyestuff having the structures shown in the following table and 0.2 g. of polyoxyethylene-nonyl-phenol ether $(EO)_{18}$ were well kneaded and dispersed in 250 cc. of water to make a dye bath whose pH was adjusted to 3.5 with an acetic acid. Then 10 g. of the yarn described in (a) above were dipped in this bath and colored in the same manner as in Example 1. After soaping treatment, there was obtained a dyeing which had excellent fastness to light, washing, rubbing, dry-cleaning, etc.

(c) Properties of dyestuff and dyeing

The degree of fastness of this dyeing was determined in accordance with AATCC methods. The results are shown in the following table.

| Ex. | Structural formulas of dyestuffs | Color shade | Fastness to— | | | |
|---|---|---|---|---|---|---|
|  |  |  | Light | Dry-cleaning | Washing | Dry rubbing |
| 2 | OH, H₂N, –N=N– (phenyl–naphthyl) | Brown | 6 | 5 | 4 | 4 |
| 3 | OH, H₂N, –N=N–, nC₄H₇ | Reddish brown | 6 | 4 | 4 | 4 |
| 4 | OH, H₂N, –N=N–, Cl | Brown | 6 | 5 | 5 | 5 |
| 5 | OH, H₂N, –N=N–, Br | Brown | 6 | 5 | 5 | 5 |
| 6 | OH, H₂N, –N=N–, COCH₃ | Brown | 5 | 4 | 4 | 4 |

| Ex. | Structural formulas of dyestuffs | Color shade | Fastness to— | | | |
|---|---|---|---|---|---|---|
| | | | Light | Dry-cleaning | Washing | Dry rubbing |
| 7 | OH, NO$_2$, H$_2$N, —N=N— (phenyl-naphthyl) | Brown | 5 | 5 | 4 | 4 |
| 8 | CH$_3$, OH, CH$_3$, H$_2$N, —N=N— | Brown | 6 | 4 | 5 | 4 |
| 9 | Cl, OH, Cl, H$_2$N, —N=N— | Bluish brown | 6 | 4 | 4 | 4 |
| 10 | OH, H$_2$N, —N=N— (naphthyl-naphthyl) | Bluish brown | 7 | 5 | 5 | 5 |
| 11 | OH, OCH$_3$, H$_2$N, —N=N— | Brown | 6 | 4 | 4 | 4 |
| 12 | OH, H$_2$N, —N=N—, CH$_3$ | Brown | 5 | 4 | 4 | 4 |
| 13 | OH, CH$_3$, H$_2$N, —N=N—, Br | Brown | 5 | 5 | 5 | 4 |

EXAMPLE 14

(a) Preparation of polypropylene fiber containing metal compound

Some 98 parts of powder isotactic polypropylene having an intrinsic viscosity of 1.50 were mixed by melting with 2 parts of nickel stearate to make a chip which was subsequently melt-spun at 250° C. and stretched 5× to give a yarn to be dyed.

(b) Method of dyeing

Some 0.2 g. of the dyestuff of the following structural formula:

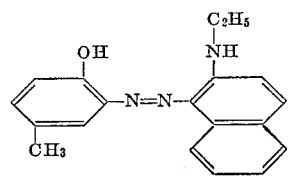

0.2 g. of sodium dinaphthylmethanesulfonate and 0.05 g. of sodium salt of lauryl alcohol sulphuric acid ester were well kneaded, and dispersed in 500 cc. of water. In this dispersion 10 g. of the yarn described in (a) above were immersed and the temperature was raised to 100° C. in 30 minutes. Treatment was effected for 1 hour at this temperature. The yarn was treated with a slightly alkaline washing liquid of a non-ionic surfactant, washed with water and thereafter dried. There was obtained a bluish brown dyeing which had excellent fastness to light, dry-cleaning, washing, rubbing, etc.

(c) Properties of dyeing

The fastness of this dyeing was determined by AATCC methods, of which the results are shown below.

| | Grade |
|---|---|
| Fastness to dry-cleaning | 5 |
| Fastness to light | 7 |
| Fastness to dry-rubbing | 4 |
| Fastness to washing | 5 |

EXAMPLES 15–23

Here, 10 g. of the yarn prepared in (a) of Example 14 were dyed by means of 0.2 g. of each dyestuff listed in the following table with other conditions kept the same as in Example 14. The results are shown below. It is recognized that these dyeings have fastness properties.

| Ex. | Structural formulas of dyestuffs | Color shade | Fastness to— | | | |
|---|---|---|---|---|---|---|
| | | | Light | Dry-cleaning | Washing | Dry rubbing |
| 15 | 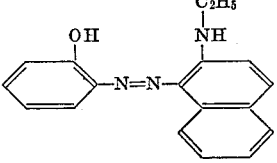 | Bluish brown | 8 | 5 | 5 | 5 |
| 16 | 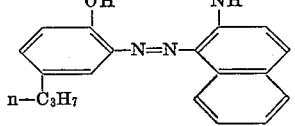 | Bluish brown | 8 | 5 | 5 | 5 |
| 17 | 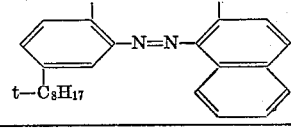 | Bluish brown | 7 | 4 | 5 | 5 |
| 18 | 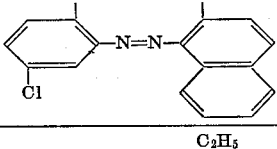 | Brown | 7 | 4 | 4 | 4 |
| 19 | 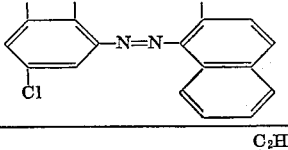 | Brown | 7 | 5 | 5 | 5 |
| 20 | 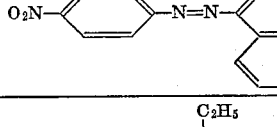 | Brown | 6 | 5 | 4 | 4 |
| 21 | 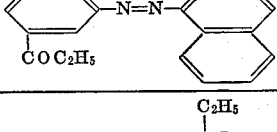 | Bluish brown | 7 | 4 | 5 | 5 |
| 22 | 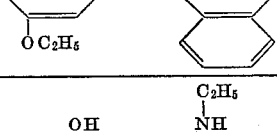 | Bluish brown | 7 | 4 | 5 | 5 |
| 23 | 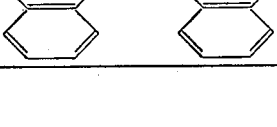 | Dark brown | 7 | 4 | 5 | 4 |

EXAMPLE 24

(a) Preparation of polypropylene fiber containing metal compound

Some 97 parts of powder isotactic polypropylene having an intrinsic viscosity of 1.53 and 3 parts of nickel naphthenate were mixed by melting to form a chip which was subsequently melt-spun at 250° C. and stretched 5× to give a yarn to be dyed.

(b) Method of dyeing

Some 0.1 g. of the dyestuff of the following structural formula:

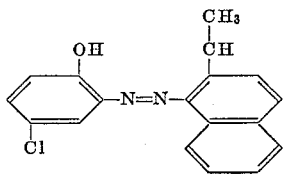

0.2 g. of polyoxyethylene-nonyl-phenol ether $(EO)_{16}$ and 0.05 g. of sodium dodecylbenzenesulfonate were finely dispersed together with a small amount of water by means of a colloid mill, and dispersed in an aqueous solution of an acetic acid whose pH was adjusted to 5.0. In this dye bath was dipped 10 g. of the yarn described in (a) above and the temperature was raised to 100° C. in 40 minutes. Dyeing was continued for 1 hour at 100° C. After washing with water, the yarn was soaping treated, washed with water, dried. Thus, there was obtained a dark brown dyeing which had excellent fastness to light, dry-cleaning, washing, rubbing, etc.

(c) Properties of dyeing

The degree of fastness was determined in accordance with AATCC methods, of which the results are shown below.

| | Grade |
|---|---|
| Fastness to light | 7 |
| Fastness to dry-cleaning | 4 |
| Fastness to washing | 5 |
| Fastness to dry rubbing | 4 |

What we claim is:

1. A process for coloring a shaped polyolefin article containing a metal compound, wherein a shaped polyolefin article obtained by melt shaping a polyolefinic resin having incorporated therein at least 0.01% by weight, calculated as metal, of a transition metal compound, is colored by means of a dyestuff of the formula

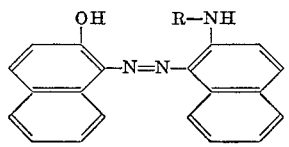

wherein R is an alkyl group having 1 to 4 carbon atoms.

2. The process of claim 1 wherein said transition metal compound is a transition metal salt of an organic fatty acid.

3. The process of claim 2 wherein said transition metal of said transition metal salt of an organic fatty acid is nickel.

References Cited

UNITED STATES PATENTS

| | | | |
|---|---|---|---|
| 3,164,438 | 1/1965 | Thomas | 8—46 |
| 3,186,788 | 6/1965 | Mills | 8—42 |
| 3,249,599 | 5/1966 | May | 8—55 |
| 3,399,027 | 8/1968 | Siegrist et al. | 8—31 |

FOREIGN PATENTS

| | | |
|---|---|---|
| 642,346 | 5/1964 | Belgium. |

OTHER REFERENCES

Color Index 2nd Edition, vol. 3, p. 3326, published 1956 by the Soc. Dyers and Col. Eng. Yorkshire.

DONALD LEVY, Primary Examiner

U.S. Cl. X.R.

8—42